United States Patent [19]

Tomisawa et al.

[11] Patent Number: 5,044,196

[45] Date of Patent: Sep. 3, 1991

[54] METHOD AND APPARATUS FOR DETECTING DETERIORATION OF A HOT-WIRE TYPE SUCKED AIR FLOW QUANTITY-DETECTING DEVICE FOR AN ENGINE

[75] Inventors: Naoki Tomisawa; Hiroshi Okada, both of Isesaki, Japan

[73] Assignee: Japan Electronic Control Systems Co., Ltd., Isesaki, Japan

[21] Appl. No.: 540,615

[22] Filed: Jun. 20, 1990

[30] Foreign Application Priority Data

Jun. 20, 1989 [JP] Japan .................. 1-155694

[51] Int. Cl.$^5$ .......................................... G01M 19/00
[52] U.S. Cl. ................................ 73/118.2; 73/204.18
[58] Field of Search ............... 73/118.2, 118.1, 204.18, 73/204.27

[56] References Cited

FOREIGN PATENT DOCUMENTS 124017 9/1980 Japan ............................ 73/118.2
60-240840 11/1985 Japan .

Primary Examiner—Jerry W. Myracle
Attorney, Agent, or Firm—Foley & Lardner

[57] ABSTRACT

The present invention relates to a method and apparatus for detecting deterioration of a hot-wire type sucked air flow quantity-detecting device of an engine, in which the change ratio of the output voltage of the hot-wire type sucked air flow quantity-detecting device is measured when the output voltage of the sucked air flow quantity-detecting device is to be changed while the engine is in the substantially non-revolving state, and deterioration is judged by comparing the measured change ratio with a predetermined value, whereby it is possible to exchange parts promptly just in time and prevent degradation of the exhaust gas-purging performance of a vehicle.

5 Claims, 3 Drawing Sheets

METHOD AND APPARATUS FOR DETECTING DETERIORATION OF A HOT-WIRE TYPE SUCKED AIR FLOW QUANTITY-DETECTING DEVICE FOR AN ENGINE

BACKGROUND OF THE INVENTION (1) Field of the Invention

The present invention relates to a method and apparatus for detecting deterioration of a hot-wire type sucked air flow quantity-detecting device used in an electronically controlled fuel injection system of an internal combustion engine.

(2) Description of the Related Art

As the conventional electronically controlled fuel injection system, for example, the following system can be mentioned (see Japanese Unexamined Patent Publication No. 60-240840).

Namely, a flow quantity Q of air sucked in an engine is detected based on a signal (voltage) emitted from a sucked air flow quantity-detecting device such as a flap type flow meter or hot-wire type flow meter, and in a control unit, a basic fuel injection quantity Tp ($=K \cdot Q/N$; K is a constant) is calculated from this sucked air flow quantity Q and an engine revolution number N calculated from an ignition signal to an ignition coil or a crank angle signal from a crank angle sensor.

Then, this basic fuel injection quantity is corrected by various correction coefficients COEF corresponding to the cooling water temperature and the like and a voltage correction component Ts corresponding to the battery voltage and the final fuel injection quantity Ti ($=Tp \cdot COEF + Ts$) is thus calculated.

A driving pulse signal having a pulse width corresponding to the above-mentioned fuel injection quantity Ti is emitted at a timing synchronous with the revolution of the engine to drive and open a fuel injection valve and effect injection of a fuel.

In the conventional system, at the idle driving of the engine, for example, when an idle switch is turned on, an upper limit level I of the sucked air flow quantity Q, which is larger by $\Delta Q1$ than the sucked air flow quantity Q at the idle driving and cannot be reached in the idle state, is set, and if the sucked air flow quantity Q exceeds this upper limit level I, it is presumed that a disorder has taken place. When the idle switch is turned off, in the driving region where the engine is not in the idle state, a lower limit level II of the sucked air flow quantity Q, which is smaller by $\Delta Q2$ than the sucked air flow quantity Q at the idle driving and below which the sucked air flow quantity Q does not decrease even in the idle state, is set, and if the sucked air flow quantity Q is lower than this lower limit level II, it is presumed that a disorder has taken place in the sucked air flow quantity-detecting device.

In this conventional disorder-detecting method, however, although an absolute disorder of the sucked air flow quantity-detecting device can be detected, a deterioration which has not reached an absolute trouble is a variation included within the ranges of $\Delta Q1$ and $\Delta Q2$ and hence, cannot be detected. This deterioration has serious influences on the exhaust gas-purging performance of a vehicle and it is difficult to maintain a good exhaust gas-purging performance of a vehicle for a long time.

Of course, it is considered that an unexpected deterioration will be detected by setting smaller values for $\Delta Q1$ and $\Delta Q2$. However, according to this method, even an inherent dispersion of the sucked air flow quantity-detecting device, a change of the atmospheric pressure irrelevant to the sucked air flow quantity-detecting device, or contamination or clogging of the suction system is erroneously judged as the deterioration.

SUMMARY OF THE INVENTION

It is a primary object of the present invention to solve the foregoing problems and provide a method and apparatus for detecting deterioration of a sucked air flow quantity-detecting device, in which deterioration of the sucked air flow quantity-detecting device can be detected without an erroneous judgement.

In accordance with the present invention, the foregoing object can be attained by a method for detecting deterioration of a sucked air flow quantity-detecting device, which comprises the following steps (a) through (c):

(a) emitting a diagnosis instruction when the output voltage of a hot-wire type sucked air flow quantity-detecting device is to be changed while the engine is in the substantially non-revolving state;

(b) measuring the ratio of the change of the output voltage of the sucked air flow quantity-detecting device on receipt of the instruction from diagnosis-instructing means; and (c) judging deterioration when the change ratio measured by output voltage change ratio-measuring means is smaller than a predetermined value.

Furthermore, in accordance with the present invention, there is provided an apparatus for detecting deterioration of a sucked air flow quantity-detecting device, which comprises the following means (d) through (f):

(d) diagnosis-instructing means for emitting a diagnosis instruction when the output voltage of a hot-wire type sucked air flow quantity-detecting device is to be changed while the engine is in the substantially non-revolving state;

(e) output voltage change ratio-measuring means for measuring the change ratio of the output voltage of the sucked air flow quantity-detecting device on receipt of the instruction from the diagnosis-instructing means; and (f) deterioration-judging means for judging deterioration when the change ratio measured by the output voltage change ratio-measuring means is smaller than a predetermined value.

It is preferred that the time when said means (d) emits the instruction be the time when start of application of electricity to the sucked air flow quantity-detecting device is detected.

It is preferred that the time when said means (d) emits the instruction be the time when stoppage of application of electricity to the sucked air flow quantity-detecting device is detected.

It is preferred that the time when said means (d) emits the instruction be the time when stalling of the engine is detected.

In the above-mentioned structure, a diagnosis instruction is emitted by the diagnosis-instructing means when the output voltage of the sucked air flow quantity-detecting device is to be changed while the engine is in the substantially non-revolving state.

As the time satisfying this condition, the following three times (1) through (3) can be mentioned.

(1) The time when application of electricity to the sucked air flow quantity-detecting device is started.

At this time, the voltage is to be changed from 0 V to a voltage corresponding to the flow quantity 0 kg/h.

(2) The time when application of electricity to the sucked air flow quantity-detecting apparatus is stopped.

At this time, the voltage is to be changed to 0 V from the voltage corresponding to the flow quantity of 0 kg/h.

(3) The time of stalling of the engine.

At this time of stalling, a certain change of the output voltage is to be caused.

By the output voltage change ratio-measuring means, the change ratio of the output voltage of the sucked air flow quantity-detecting means is measured on receipt of the diagnosis instruction, and by the deterioration-detecting means, it is judged that deterioration in the sucked air flow quantity-detecting device is present, when the measured change ratio is smaller than a predetermined value.

Namely, according to the present invention, the change ratio of the output voltage of the hot-wire type sucked air flow quantity-detecting device is measured when the output voltage of the sucked air flow quantity-detecting device is to be changed while the engine is in the substantially non-revolving state, and the measured change ratio is compared with a predetermined value to detect deterioration of the sucked air flow quantity-detecting device, whereby it is possible to perform exchange of parts just in time and prevent degradation of the exhaust gas-purging performance of a vehicle.

The characteristic structure of the present invention and the function attained by this structure will now be described in detail with reference to one embodiment illustrated in the accompanying drawings.

DETAILED DESCRIPTION OF THE PREFERRED EMBODIMENT

Figure 1:
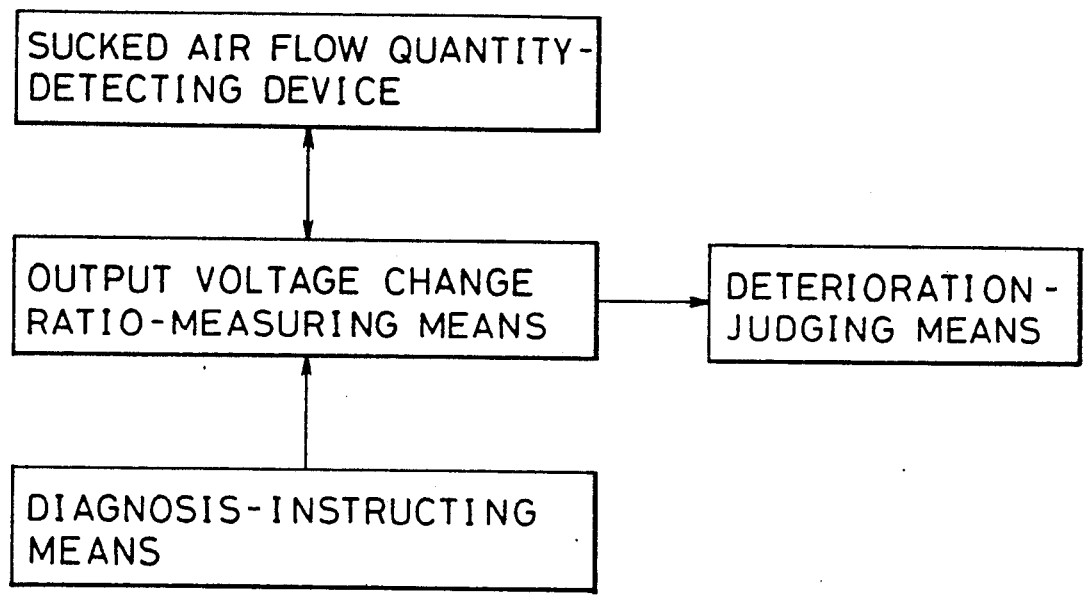
FIG. 1 is a functional block diagram illustrating the structure of the present invention.
Figure 2:
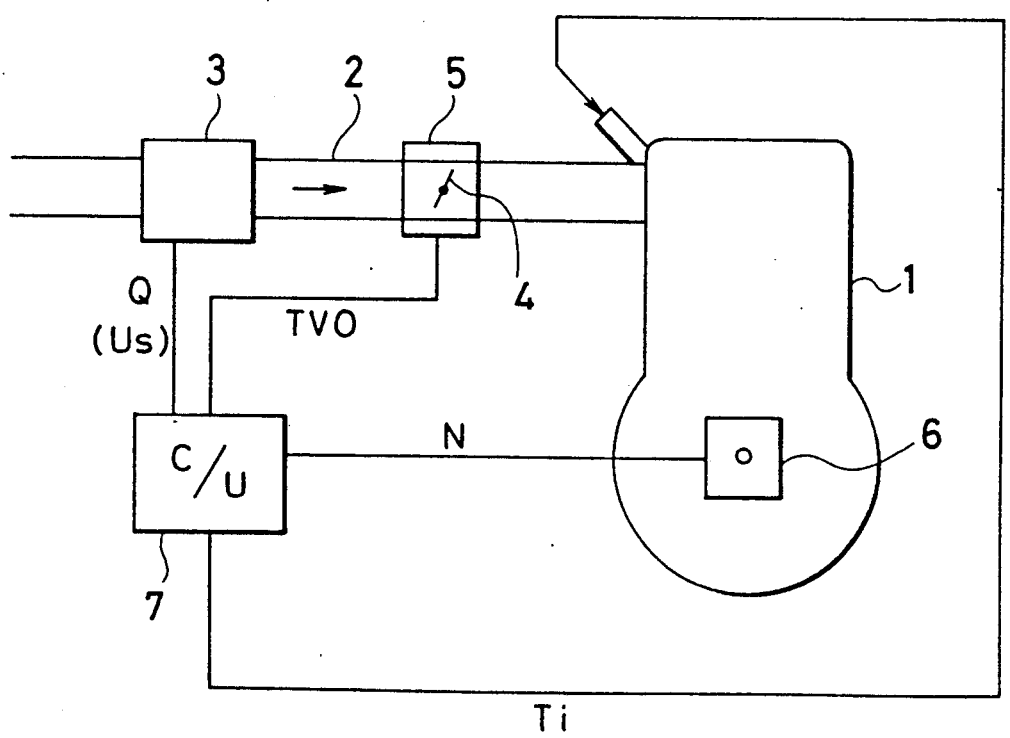
FIG. 2 is a system diagram illustrating one embodiment of the present invention.
Figure 3:
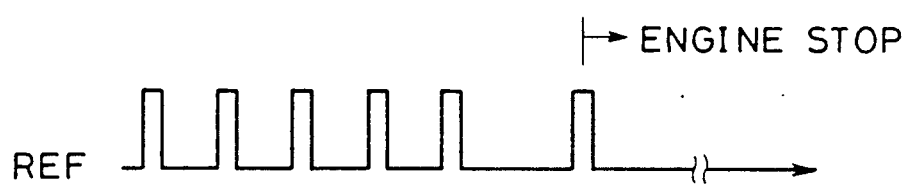
FIG. 3 is a diagram illustrating the state of deterioration of the sucked air flow quantity-detecting device.
Figure 3:
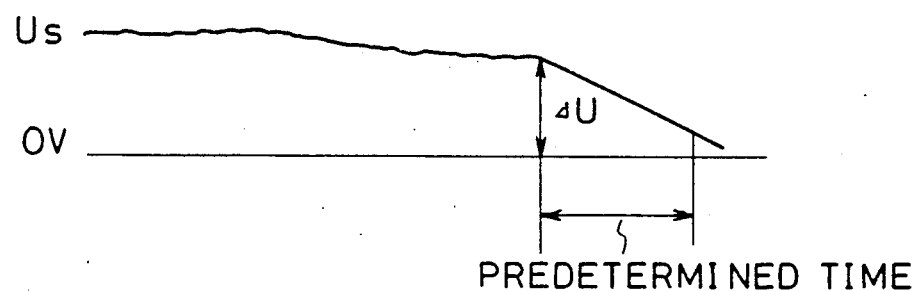
Figure 4:
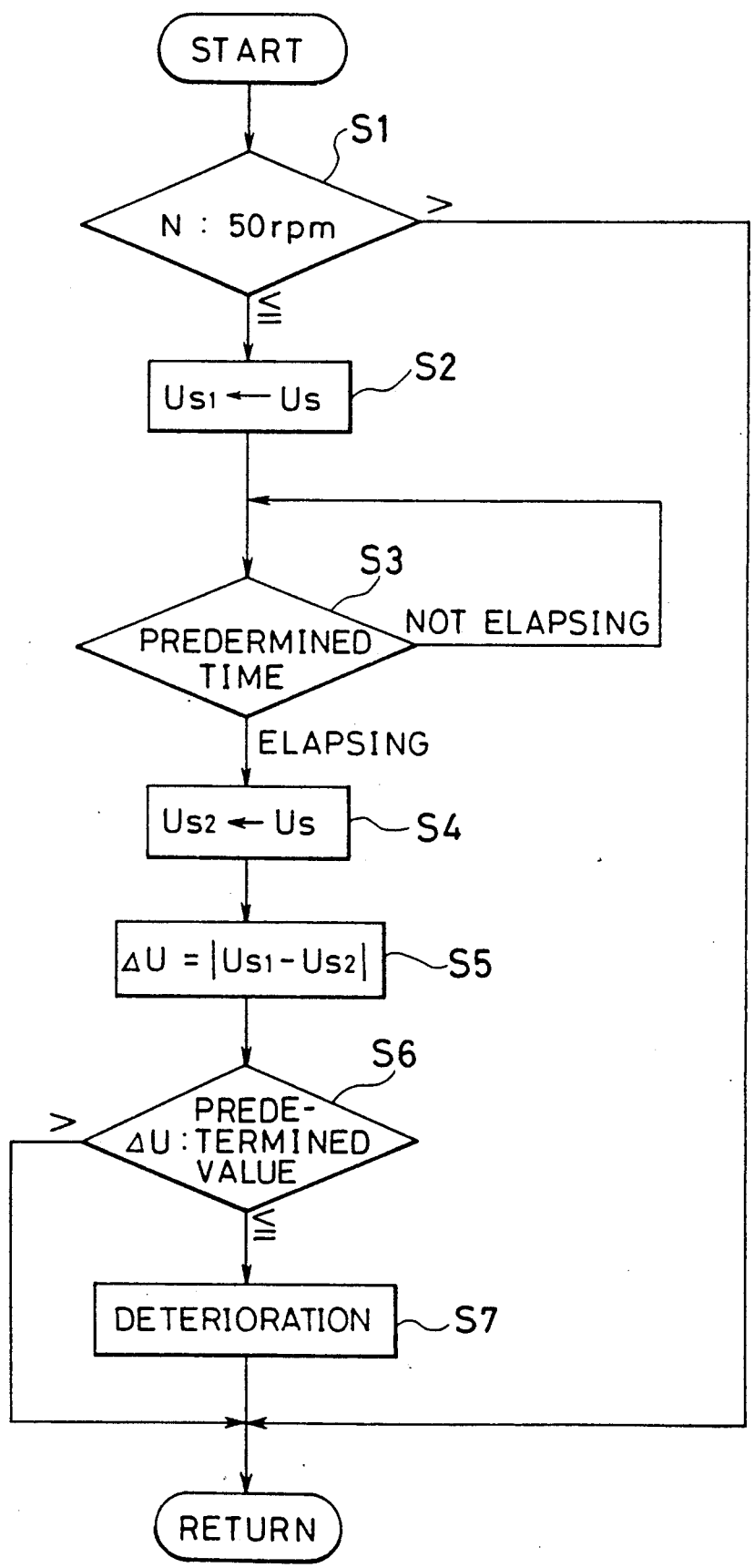
FIG. 4 is a flow chart showing the contents of the control routine.

The outline of the present invention is as shown in FIG. 1, and one embodiment is illustrated in FIGS. 2 through 4.

The system of the present embodiment will now be described with reference to FIG. 2.

On the upstream side of a suction path 2 of an engine 1, there is disposed a hot-wire type sucked air flow quantity-detecting device (hereinafter referred to as "air flow meter") 3 generating a voltage Us corresponding to the sucked air flow quantity Q. On the downstream side of the suction path 2, there is disposed a throttle valve 4 to which a throttle sensor 5 for detecting the opening degree of the throttle valve 4 is attached. Furthermore, an engine revolution number sensor 6 for detecting the engine revolution number N as the engine revolution speed, such as a crank angle sensor, is disposed in the engine 1.

The sucked air flow quantity Q, the opening degree TV0 of the throttle valve and the engine revolution number N are put into a control unit 7. The routine shown in FIG. 4 is executed in the control unit 7 at every predetermined time to detect deterioration of the air flow meter 3.

At the time of stalling of the engine, as shown in FIG. 3, the engine revolution number N gradually decreases and finally, the revolution is stopped (this is indicated by a reference signal REF emitted from the crank angle sensor in the drawings). Simultaneously, suction of air into the engine is stopped and the output voltage Us corresponding to the sucked air flow quantity, emitted from the air-flow meter 3, is reduced. However, if the response characteristic of the air flow meter 3, especially an element such as a hot wire, is deteriorated, the thermal resistance is reduced and the output voltage Us is slowly reduced at a change ratio lower than the change ratio at which the output voltage should inherently be reduced.

Therefore, the present invention is constructed so that deterioration of the air flow meter is detected by comparing the change ratio $\Delta U$ of the output voltage Us at the predetermined time with a predetermined value.

The routine shown in FIG. 4 will now be described.

At step 1 (expressed as S1 in the drawings; subsequent steps are similarly expressed), the engine revolution number N is compared with 50 rpm, and if the engine revolution number N is smaller than 50 rpm, it is presumed that the engine is at the stalling, and the routine goes into step 2. If the engine revolution number N is larger than 50 rpm, the routine is ended.

This step 1 corresponds to the diagnosis-instructing means.

At step 2, the voltage Us emitted from the air flow meter 3 is substituted for Us1, and at step 3, the lapse of a predetermined time from the substitution is waited and the routine goes into step 4.

At step 4, the voltage Us is substituted for Us2.

At step 5, the absolute value $\Delta U$ of the difference between Us1 and Us2 is calculated, and the change ratio $\Delta U$ of the output voltage Us during the predetermined time is determined.

These steps 2 through 5 correspond to the output voltage change ratio-measuring means.

The obtained value is compared with a predetermined value at step 6, and when the obtained value is smaller than the predetermined value, deterioration is judged at step 7 and the routine is ended. If the obtained value is larger than the predetermined value, since deterioration is not present, the routine is directly ended.

When deterioration is judged, a driver is informed of deterioration, for example, by lighting a warning lamp.

These steps 6 and 7 correspond to the deterioration-judging means.

As is apparent from the foregoing description, in case of a hot-wire type air flow meter, the thermal resistance is reduced if deterioration is present, and therefore, even if the revolution number of the engine is reduced substantially to zero, the voltage Us is not abruptly reduced. Accordingly, by detecting the reduction of the voltage Us, the presence or absence of deterioration can be judged.

As is apparent from the foregoing description, according to the present invention, the change ratio of a hot-wire type air flow meter is measured when the output voltage of the air flow meter is to be changed while the engine is in the substantially non-revolving state, and deterioration of the air flow meter is detected by comparing the measured change ratio with a predetermined value, whereby it is possible to exchange parts promptly just in time and prevent degradation of the exhaust gas-purging performance of a vehicle. This is the effect attained by the present invention.

We claim:

1. A method for detecting deterioration of a hot-wire type sucked air flow quantity-detecting device for detecting the flow quantity of air sucked in an engine, which comprises the step of emitting a diagnosis instruction when the output voltage of the hot-wire type sucked air flow quantity-detecting device is to be changed while the engine is in the substantially non-revolving state, the step of measuring the ratio of the change of the output voltage of the sucked air flow quantity-detecting device on receipt of the instruction from a diagnosis-instructing unit, and the step of judging deterioration when the change ratio measured by an output voltage change ratio-measuring unit is smaller than a predetermined value.

2. An apparatus for detecting deterioration of a hot-wire type sucked air flow quantity-detecting device for detecting the flow quantity of air sucked in an engine, which comprises diagnosis-instructing means for emitting a diagnosis instruction when the output voltage of the hot-wire type sucked air flow quantity-detecting device is to be changed while the engine is in the substantially non-revolving state, output voltage change ratio-measuring means for measuring the change ratio of the output voltage of the sucked air flow quantity-detecting device on receipt of the instruction from the diagnosis-instructing means, and deterioration-judging means for judging deterioration when the change ratio measured by the output voltage change ratio-measuring means is smaller than a predetermined value.

3. An apparatus for detecting deterioration of a hot-wire type sucked air flow quantity-detection device of an engine according to claim 2, wherein the time of emitting the instruction by the diagnosis-instructing means is the time when the start of application of electricity to the sucked air flow quantity-detecting device is detected.

4. An apparatus for detecting deterioration of a hot-wire type sucked air flow quantity-detecting device of an engine according to claim 2, wherein the time of emitting the instruction by the diagnosis-instructing means is the time when the stop of application of electricity to the sucked air flow quantity-detecting device is detected.

5. An apparatus for detecting deterioration of a hot-wire type sucked air flow quantity-detecting device of an engine according to claim 2, wherein the time of emitting the instruction by the diagnosis-instructing means is the time when stalling of the engine is detected.

* * * * *